United States Patent [19]

Mitts et al.

[11] Patent Number: 5,896,373
[45] Date of Patent: Apr. 20, 1999

[54] METHOD FOR EXECUTING HANDOVER IN A RADIO EXTENSION OF AN ATM NETWORK

[75] Inventors: Håkan Mitts, Helsinki; Jukka Immonen; Harri Hansen, both of Espoo, all of Finland

[73] Assignee: Nokia Mobile Phones, Ltd., Salo, Finland

[21] Appl. No.: 08/802,401

[22] Filed: Feb. 18, 1997

[30] Foreign Application Priority Data

Feb. 22, 1996 [FI] Finland ................................. 960815

[51] Int. Cl.⁶ ........................................................ H04Q 7/00
[52] U.S. Cl. ...................... 370/331; 370/329; 455/436; 455/437; 455/439
[58] Field of Search .................................. 370/329, 331; 455/436, 437, 438, 439, 442, 524, 525, 441, 444

[56] References Cited

U.S. PATENT DOCUMENTS

| | | | |
|---|---|---|---|
| 4,989,204 | 1/1991 | Shimizu et al. | 370/94.1 |
| 5,345,448 | 9/1994 | Keskitalo | 370/95.3 |
| 5,371,738 | 12/1994 | Moelard et al. | 445/437 |
| 5,384,826 | 1/1995 | Amitay | 379/60 |
| 5,410,733 | 4/1995 | Niva et al. | 455/33.2 |
| 5,434,854 | 7/1995 | Focarile et al. | 455/442 |
| 5,483,668 | 1/1996 | Malkamaki et al. | 455/33.2 |
| 5,524,009 | 6/1996 | Tuutijarvi et al. | 370/95.3 |

FOREIGN PATENT DOCUMENTS

| | | |
|---|---|---|
| 0366342 A3 | 5/1990 | European Pat. Off. . |
| 0426269 A1 | 5/1991 | European Pat. Off. . |
| 0522773 A2 | 1/1993 | European Pat. Off. . |
| 0577959 A1 | 1/1994 | European Pat. Off. . |
| 0577960 A1 | 1/1994 | European Pat. Off. . |
| WO 95/32594 | 11/1995 | WIPO . |

OTHER PUBLICATIONS

"BAHAMA: A Broadband Ad-Hoc Wireless ATM Local-Area Network", Proc. ICC '95, K. Y. Eng. et al.

Primary Examiner—Michael Horabik
Assistant Examiner—Timothy Edwards, Jr.
Attorney, Agent, or Firm—Perman & Green, LLP

[57] ABSTRACT

In the handover of a radio extension of an ATM network there are used markers that are located at fixed locations in the ATM cell stream in order to indicate the ending of an uplink and downlink cell stream, so that the switching of cell streams can be carried out in a synchronised fashion, and cells are not lost and their relative order does not change. If a downlink data transmission via the old access point succeeds, the old access point attaches to the last forwarded information field a notice of closing the traffic, in which case the mobile terminal transfers the information of successful transmission to the new access point. In another case, the old access point sends the unforwarded cells to the new access point and terminates the transaction with the same marker that generally indicates the end of a downlink cell stream.

8 Claims, 17 Drawing Sheets

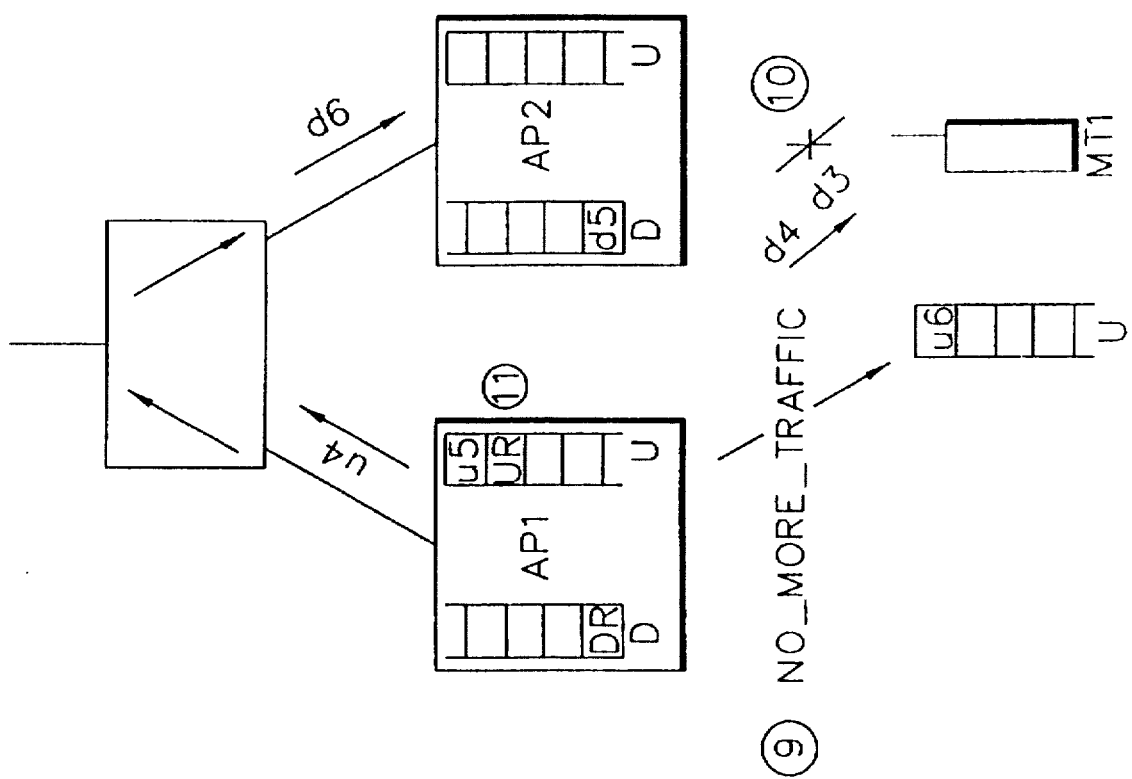

METHOD FOR EXECUTING HANDOVER IN A RADIO EXTENSION OF AN ATM NETWORK

BACKGROUND OF THE INVENTION

The invention relates generally to operations aiming at the mobility of a wireless terminal in a data transmission network, where data is transmitted in packets, i.e. cells. The invention particularly relates to a method, the application whereof reduces interference in data transmission in a situation where the wireless terminal of an ATM network performs a handover.

The ATM (Asynchronous Transfer Mode) network is a data transmission system where data is transferred in digital form as 53-byte cells from one terminal to another through switches and rapid transfer connections therebetween. Each cell contains a 48-byte payload and a 5-byte header. In order to save space, the header information of each cell does not include complete address information describing the used data transfer route from the transmitting to the receiving device, but only information of the virtual path and channel where said data transfer connection is being carried. The switches or nodes of the network contain necessary routing information, on the basis whereof said identifiers of the virtual path and channel are interpreted as references to the respective node in succession.

It is to be expected that in the future the ATM network, which has so far been based mainly on cable connections, will also serve wireless terminals that are in contact with the network via radio base stations, i.e. access points. These mobile terminals may move with respect to the base stations and their coverage area, in which case the system must be able to execute a handover when necessary. A specific feature of each ATM connection is the contract between the terminal and the network as to the quality of service (QoS) required by the connection. This contract particularly covers the maximum length of the delays allowed in the connection and the capacity needed by the connection, which capacity is measured in units of transfer rate (for instance cells/s). The agreed quality of service for the connection and its upkeep are important factors when making decisions as for the point of time of the handover and the new base station to be assigned for a given mobile terminal.

FIG. 1 illustrates a simple radio extension of an ATM system comprising a mobile terminal 1, three base stations, henceforth called access points (AP) 2, 3 and 4, as well as a switch 5 transmitting connections between the access points and the rest of the network. At first the connection between the mobile terminal 1 and the ATM network proceeds via the access point 2. During connection, the mobile terminal may also have information of the existence of access points 3 and 4 as recorded in a (given register of alternative access points. When the connection to the access point 2 weakens the mobile terminal 1 hands the connection over to the access point 3 or 4. The mobile terminal 1 may also have several simultaneous ATM connections with cell streams that are independent of each other.

It is typical of the ATM system that cells of a given cell stream must not be lost; neither are the cells allowed to double or to change their relative order at the different stages of the connection, which would cause difficult synchronisation demands in the handover. A loss of cells or a confusion in their relative order generally results in that on some higher protocol layer, there is detected an incorrect check sum or other indicator, in which case a certain multi-cell data structure PDU (Protocol Data Unit) is discarded and selected to be retransmitted. This is uneconomical from the point of view of utilising the network capacity.

The handing over of access points in a wireless ATM network has been discussed in prior art publications, but they have usually not dealt with problems connected to the quality of service nor suggested a method for preventing the loss, doubling or disorganisation of ATM cells. In the patent publication EP 426,269 (British Telecommunications) there is known a method where base stations are grouped into groups of several stations. In order to help and speed up the handover, all cells directed to a mobile terminal located in the coverage area of a given base station are transmitted, by the data transmission network, to all base stations of the same group. Said publication introduces a system where the old base station transmits all cells that it has received, whereafter a new base station starts transmitting cells that are transferred therethrough. The publication also introduces a predictor mechanism to be connected to the base station control unit or to the switch controlling the base stations, the task of said predictor being to observe the movements of the mobile terminal from one coverage area to another and to estimate to which area the mobile terminal will move next. The purpose of this system is to reduce the number of cells that are transmitted in vain to the more distant base stations in the group. This application is not, however, capable of maintaining the order of the cells nor preventing the loss of certain cells, because the old and the new base station cannot know exactly which cells were transmitted and received correctly immediately before and/or after the handover.

From the patent publication EP 366,342 (AT & T) there is known a system where data is transmitted in a cellular radio network as cells, and the header of each cell contains an unchanging part which remains the same irrespective of chances in the routing, plus a changing part, the content whereof changes in connection with the handover or some other change in the routing. The publication suggests that the handover can be made easier by means of said system, but only as regards the definition of the routing. A similar system is described in the EP patent publication 577,959 (Roke Manor Research Ltd.), where the focus is particularly an ATM network. Now the unchanging part of the cell header is a so-called VCI (Virtual Channel Identifier) field, and the changing part is a so-called VPI (Virtual Path Identifier) field. Neither of said publications describes a method that could guarantee the maintenance of the order of the cells and/or prevent their loss during a handover.

From the EP patent publication 577,960 (Roke Manor Research Ltd.) there is known an application where at least one of the base stations of the cellular network is, via the ATM network, connected to at least two switches, which in said application also serve as gateway equipment for the ATM network and the cable-transmitted telephone network. The idea is to arrange the route-defining VPI and VCI codes of the ATM network so that although a given mobile terminal moves over to an area covered by another switch (or another mobile phone exchange), the routing is taken care of by linkage through the original switch. This arrangement has certain advantages in order to reduce connections to be switched in the network, but it does not affect possible loss and/or delay of cells taking place in between access points and the mobile terminal during a handover.

The article "BAHAMA: A Broadband Ad-Hoc Wireless ATM Local-Area Network", Proc. ICC '95, 18–22 Jun. 1995, Seattle, by K. Y. Eng et al, describes an arrangement where the GFC field included in the header part of the ATM cells is used for realising a sequential numbering on a per-cell basis. The purpose is to enhance the synchronisation and combining of cell streams arriving via two parallel routes to a given merging point. A particular aim of the numbering of cells is that they could be unambiguously identified, so that the cells would not be doubled or lost when combining cell streams, and that their order would remain unchanged. A new problem could now be that by means of the maximum four bits of the GFC field, only numbers from 0 to 15 can be represented, in which case the numbering cycle becomes so short that successive cells with similar numbers can be confused.

From the Finnish patent application FI 955,812, "Maintaining the composition of transferred data during handover", applicant Nokia Mobile Phones Oy, which is not yet public when the present application is being filed, there is known a method where ATM cells can be referred to with an accuracy of at least a given amount of cells, in which case the base stations can exchange information as to which cells were transmitted and/or received successfully in connection with the handover. In said method, the old base station sends to the ATM switch and/or to the new base station information as to which cells were successfully transferred therefrom to the new base station, in which case the transferring of cells is continued between the new access point and the mobile terminal starting from the first cell which was not successfully transmitted via the old access point. Moreover, the application introduces an acknowledgement system, whereby a given access point and mobile terminal both control which cells were successfully transferred over the radio connection. This method does not take into account the general control of the handover nor the quality of service agreed for the different connections.

SUMMARY OF THE INVENTION

The object of the present invention is to provide a handover protocol suited for a radio extension of an ATM network, which protocol prevents the loss or doubling of transmitted cells.

The objects of the invention are achieved by arranging the traffic between the access points, switches and mobile terminal in a suitable fashion and by sending the information describing the closing of the old connection to the new access point via the mobile terminal.

The method of the invention for executing a handover in a data transmission system comprising a switch, a first access point, a second access point and a mobile terminal, and where data is transmitted as cells of a determined size, is characterised in that said first access point investigates whether all cells transferred from the switch to the first access point prior to the handover were successfully transmitted to said mobile terminal, whereafter

- as a response to the observation of the first access point, according to which all cells transferred from the switch to the first access point prior to the handover were successfully transmitted to said mobile terminal, said first access point sends acknowledgement of successful downlink transmission to said mobile terminal, which then, as a response to said acknowledgement further informs the second access point that the downlink transmission via the first access point was successful and
- as a response to the observation of the first access point, according to which all cells transferred from the switch to the first access point were not successfully transmitted to said mobile terminal, said first access point directs those cells that were not successfully transmitted to said mobile terminal to be forwarded to the second access point.

The procedure of the present invention uses particular marker cells, which are transported in the cell stream according to the same rules as ordinary ATM cells; by means of the marker cells, the access points and the switch together send information as to when the cell transfer in a given direction will terminate. Moreover, in the procedure of the invention, the old access point receives information of the address of the new access point, so that it can, when necessary, forward the untransmitted downlink cells to the new access point. If the old access point is able to transfer all downlink ATM cells that were assigned to it to the mobile terminal before the old connection terminates, it adds the information to that effect to the transferable cell stream sent to the mobile terminal, and the mobile terminal forwards the information to the new access point. Downlink data transmission via the new access point can be started immediately after the new access point has received acknowledgement of the termination of the old connection.

A radio extension of an ATM network according to the method of the present invention is easily modified to comprise a larger or smaller number of access points. When the data transmission between the access points and the switch relating to for instance the termination of a cell stream in a given direction is arranged according to the system of the present invention, the switch has good possibilities to continuously control the operation over the whole radio extension. Moreover, the switch needs not be dependent on the radio traffic standards nor connection practices applied in the system, because it needs not make decisions per given access point, which decisions are affected for example by the different radio interfaces offered by the access points to the mobile terminals. Neither does the switch necessarily require any type of cell buffering in connection with the handover, which makes the dimensioning of the switch memory capacity remarkably easier.

BRIEF DESCRIPTION OF THE DRAWING

The invention is explained in more detail below, with reference to the preferred embodiments described by way of example, and to the accompanying drawings, where

FIGS. 2a–2f illustrate the steps of application of a preferred embodiment of the invention in a backward handover;

In the above description of the prior art we referred to FIG. 1; hence, the following specification of the invention and its preferred embodiments, mainly FIGS. 2–5 will be referred to. Like numbers for like parts are being used in the drawings.

DETAILED DESCRIPTION OF THE INVENTION

Figure 1:
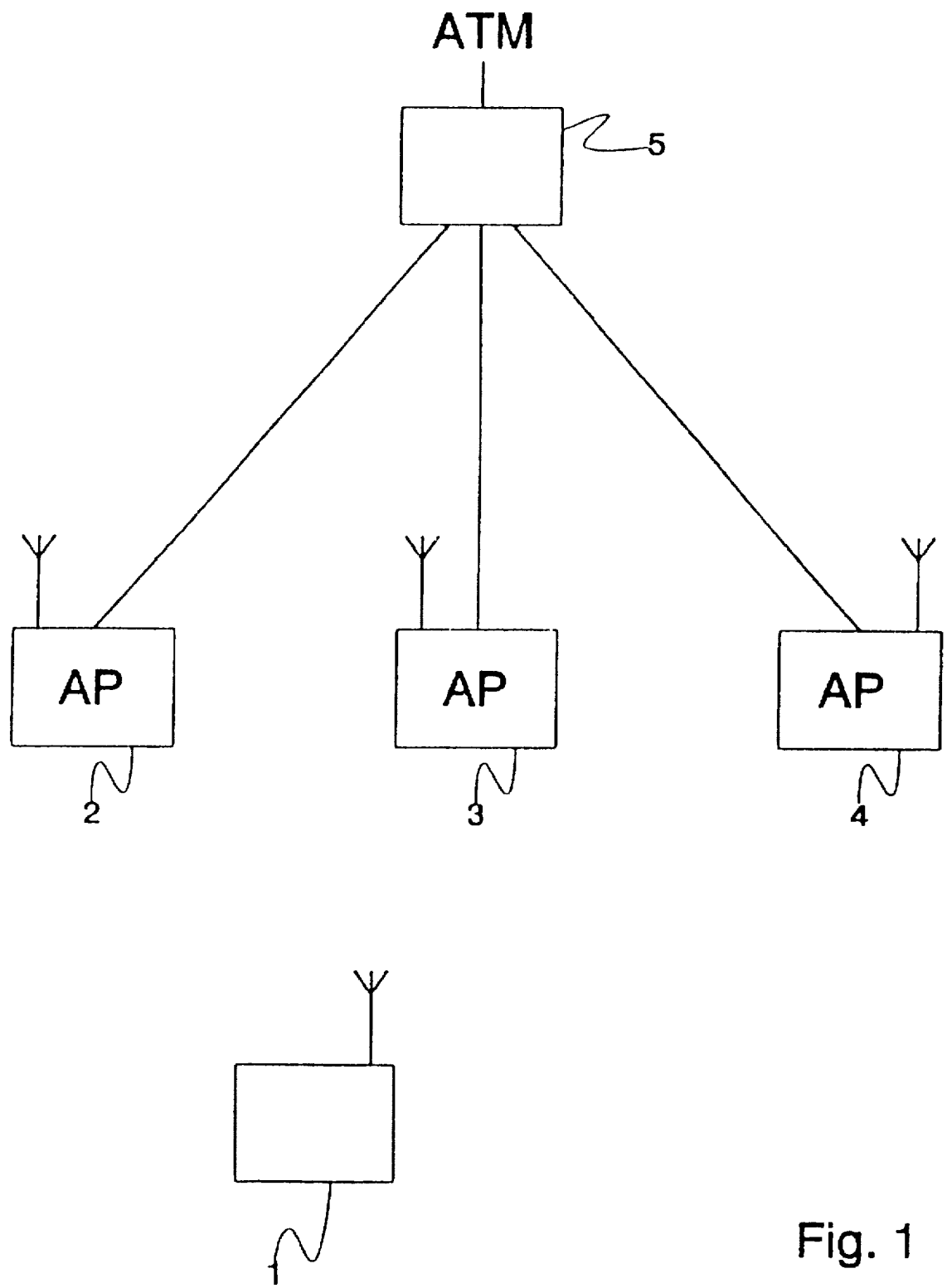
FIG. 1 illustrates a prior art radio extension of an ATM network.

Let us first explain a backward handover, where the method of a preferred embodiment of the invention is applied. Handovers are generally divided into two types: a controlled, i.e. a backward handover, where information of the handover exists before the connection between the mobile terminal and the old access point is closed, and an interference-based, i.e. a forward handover, where the mobile terminal disappears from the coverage area of the old access point so quickly, that there is no time to officially terminate the connection. As an example, let us now describe a situation where the mobile terminal has only one connection to the ATM network. For anyone skilled in the art it is obvious that there may be several connections independent of each other. In the specification below, uplink ATM cells are, by way of example, represented by numbers u1, u2, u3 etc., and downlink ATM cells by numbers d1, d2, d3 etc. where the number of each cell refers to its location in the cell stream. It is pointed out that the numbering of all individual ATM cells is generally not practical nor even possible and the numbers are used in this specification and accompanying drawings only in order to facilitate the understanding of the invention. The standard-form messages represented in the drawings are written with capital letters, and the encircled numbers attached to them and certain other procedures refer to their relative chronological order. The numbers of cells and messages are not linked to each other.

Figure 2A:
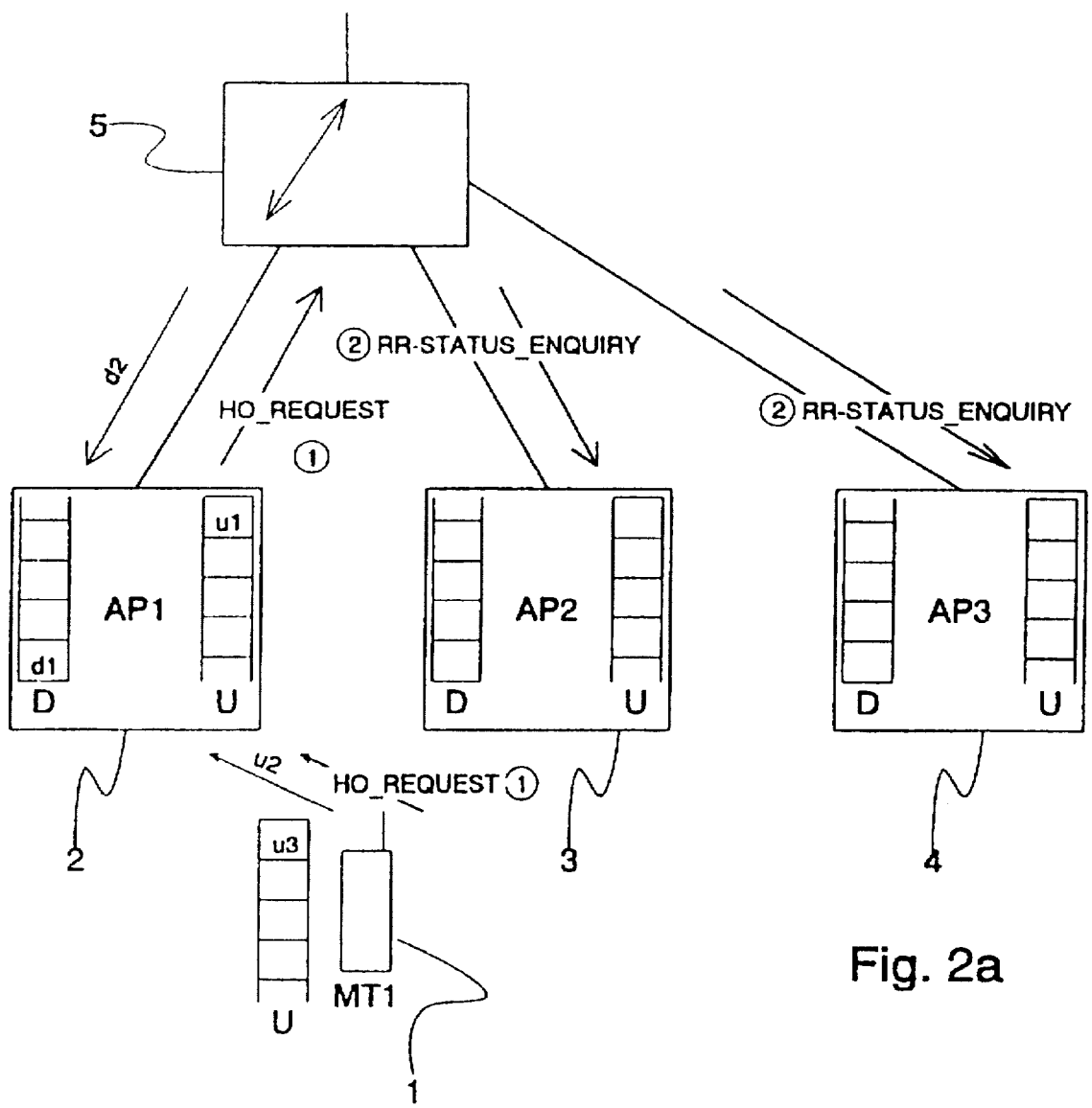

FIG. 2a illustrates a radio extension of an ATM system comprising a mobile terminal 1, three access points 2, 3 and 4 and a switch 5. Each access point has a FIFO (First-In-First-Out) type register D for the temporary storing of downlink cells, and a corresponding register U for the temporary storing of uplink cells. Moreover, the mobile terminal 1 includes a corresponding register U for the temporary storing of uplink cells. During normal operation, the mobile terminal 1 also keeps up a list (not illustrated in the drawing) of those access points that it hears. The list may be arranged in an order of preference, for instance on the basis of the quality of an assumed connection, or on the basis of factors connected to prices.

Figure 2B:
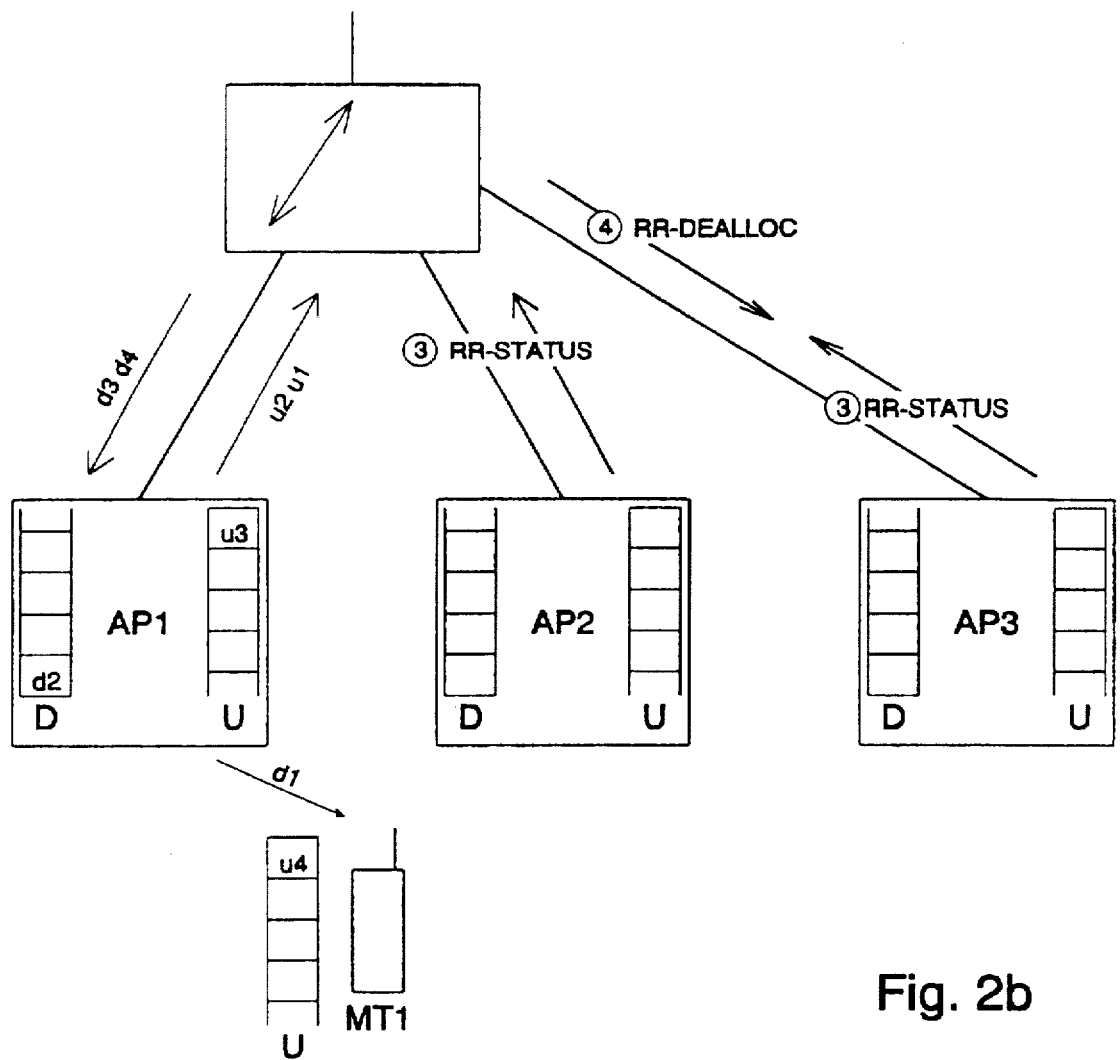

When the mobile terminal 1 senses that the connection to the old access point 2 is weakening, it makes a decision to start the handover procedure. The mobile terminal 1 sends a HO_REQUEST message, which the access point 2 transmits to the switch 5. The message contains, among others, a list in order of preference of those access points to which the mobile terminal 1 can hand over, i.e. that it hears. As a response to the HO_REQUEST message, the switch 5 can now select the new access point directly, or it can send a status enquiry, i.e. a RR-STATUS_ENQUIRY message to all access points in the list or to only part of them in order to find out how the different access points could take over the new connection. Now each access point that has received the status enquiry checks the situation, makes a preliminary reservation of the required resources and responds to the switch with a RR-STATUS message to indicate whether the connection can be transmitted or not and what is the identifier of the preliminary reservation. On the basis of the received responses, or in a simpler embodiment only on the basis of the list included in the HO_REQUEST message, the switch 5 selects, among the access points that sent a positive answer, the one with the highest priority. In FIG. 2b, the switch 5 selects the access point 3 and sends the access point 4 a RR-DEALLOC message, which cancels the preliminary reservation of the resources in access point 4.

Figure 2C:
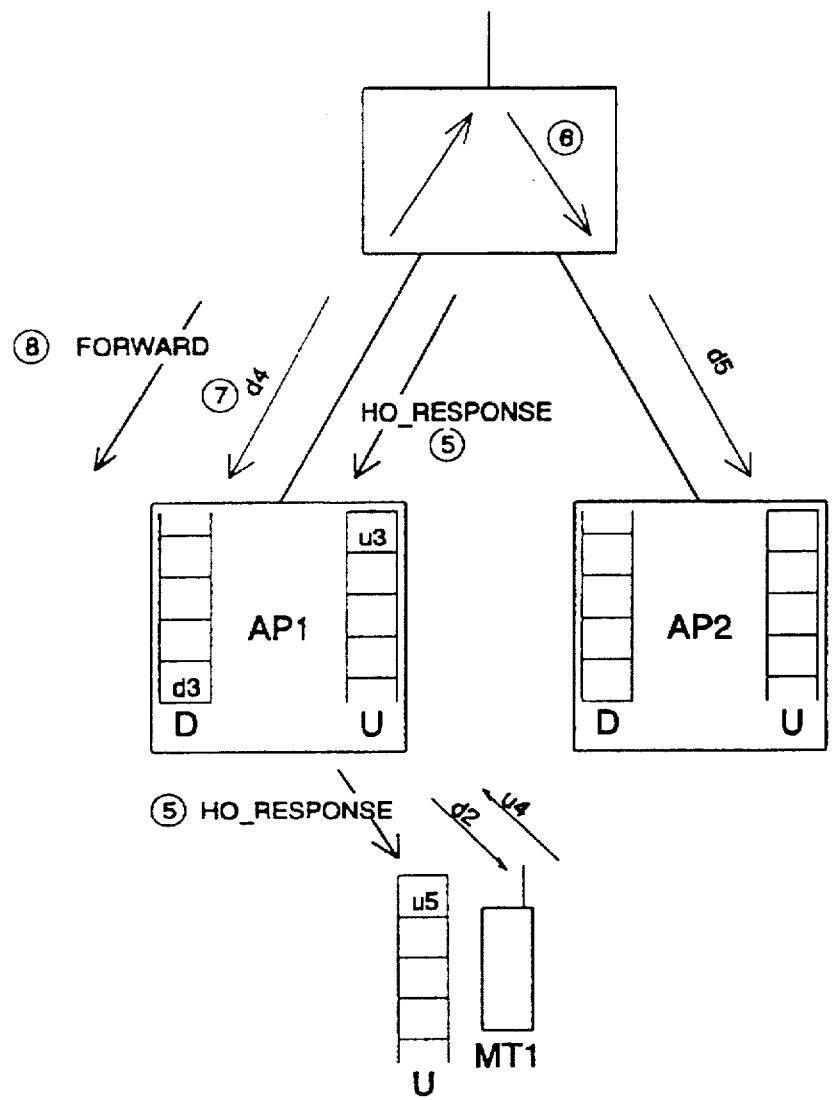

According to FIG. 2c, after the switch 5 has chosen a new access point, it sends, via the old access point 2, to the mobile terminal 1, a HO_RESPONSE message containing, among others, information of the new access point. At the same time, the switch 5 changes the routing of the downlink cells toward the new access point 3. After the last cell transmitted downlink via the old access point, the switch adds a Down_ready signal DR, which can be for instance an ATM cell of a given form. Because the signal DR is transported through the same virtual channel as the other cells, its location in relation to other cells remains constant. The use of signals in indicating the end of a cell stream has been dealt with in the FI patent application 955,812 referred to in the description of the prior art above. It is possible that the radio connection between the old access point 2 and the mobile terminal 1 terminates before the old access point 2 has transported all downlink cells to the mobile terminal 1. With this in mind, the switch 5 sends to the access point 2 a FORWARD message containing, among others, information of the new access point, so that the old access point can, when necessary, transport the untransmitted cells to the new access point in a procedure to be described below.

The mobile terminal 1 can now decide to hand the radio connection over to the new access point immediately after receiving the HO_RESPONSE message sent by the switch. In connections where the timing is not critical, it may be most advantageous for the mobile terminal 1 to wait until the old access point 2 has sent all downlink cells transferred therethrough. On the other hand, the mobile terminal 1 can also decide to hand the connection over to the new access point immediately, in order to cause as little disturbance as possible in the stream of downlink cells. As for the uplink and downlink connections, the handover may take place at different times. Moreover, if several connections are maintained simultaneously in between the mobile terminal 1 and the switch 5, the handover becomes remarkably more complicated than the one described here. Owing to different demands for the quality of service, for instance, the mobile terminal may handle the various connections differently during handover. The most advantageous way to determine the moment of handover is found out by calculatory simulation of various usage situations, or by experimenting.

If the old access point 2 is capable of sending all downlink cells transmitted therethrough to the mobile terminal 1 (i.e., the above mentioned DR signal gets the downlink transmission turn), it finally declares the ending of downlink cells for instance by sending, a given No_more_traffic flag according to FIG. 2d. The inclusion of this flag in the last downlink information field sent over the radio connection is more economical than the transmission of the whole DR marked cell to the mobile terminal 1. The mobile terminal 1 terminates the uplink connection at a chosen moment, when the old access point 2 adds, after the last transmitted uplink cell, a given Up_ready signal UR, the location whereof in relation to the cell stream is constant. After receiving said signal, the switch 5 can allow the transmission of uplink cells via the new access point 3 without changing the relative order of the cells.

The method of the invention requires that the old access point and the mobile terminal have identical information as to when the connection is closed, i.e. which are the last uplink and downlink cells to be transmitted over the radio connection. One method to achieve this agreement is described in the FI patent application 955,812 referred to above. Other methods can be applied, too.

Figure 2E:
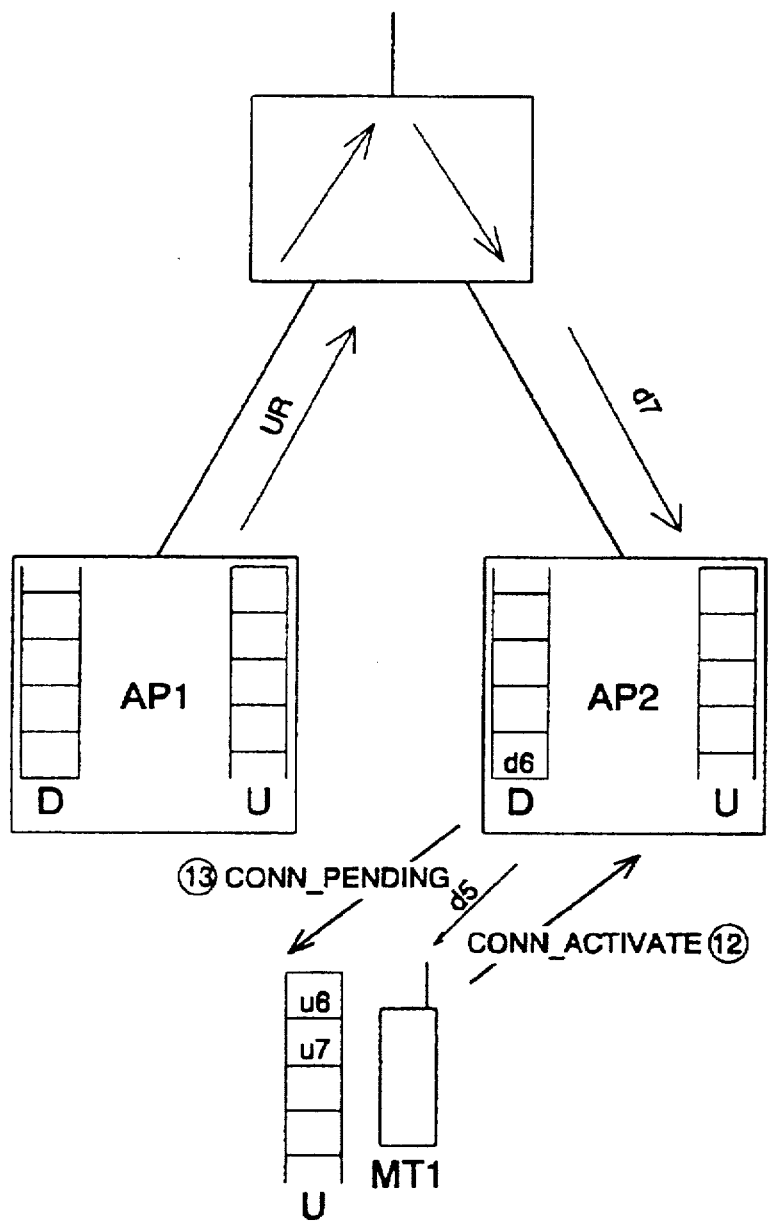

In the next step, the mobile terminal 1 forms a radio connection with the new access point 3 and sends it a CONN_ACTIVATE message in order to activate transferable ATM connections according to FIG. 2e. The message contains connectionwise information as to whether the mobile terminal has received the No_more_traffic information per each connection from the old access point. This information can be transmitted for instance in the form of a given DR_flag. The CONN_ACTIVATE message informs the new access point 3 that the mobile terminal 1 is ready to receive downlink cells connected to these connections, and contains the necessary MVC (Mobile Virtual Circuit) signals and other information owing to which the new access point 3 can start the transmission of downlink cells immediately. In the case of FIG. 2e, the new access point 3 had buffered downlink cells in advance, so that it starts their transmission as a response to the CONN_ACTIVATE message. At the same time the new access point 3 sends the mobile terminal 2 a certain CONN_PENDING message to indicate that uplink connections cannot as yet be opened.

Figure 2F:
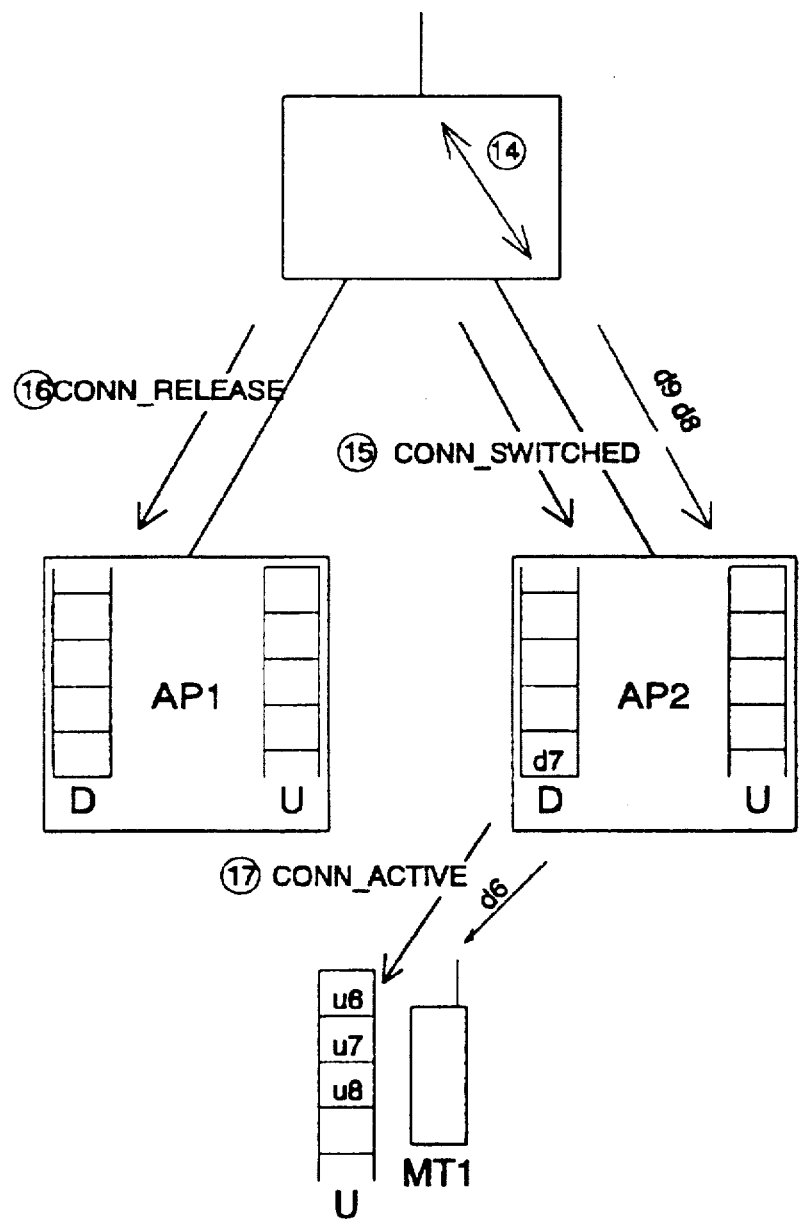

When the switch has received the Up_ready message sent by the old access point, the switch transfers, according to FIG. 2f, the routing of uplink cells to the new access point 3 and informs this by a CONN_SWITCHED message. The connection towards the old access point 9 is closed by a CONN_RELEASE message. When the new access point 3 has received the CONN_SWITCHED message sent by the switch, it sends the mobile terminal 1 a certain CONN_ACTIVE message, whereafter the mobile terminal can start the transmission of uplink cells via the new access point 3.

Figure 3:
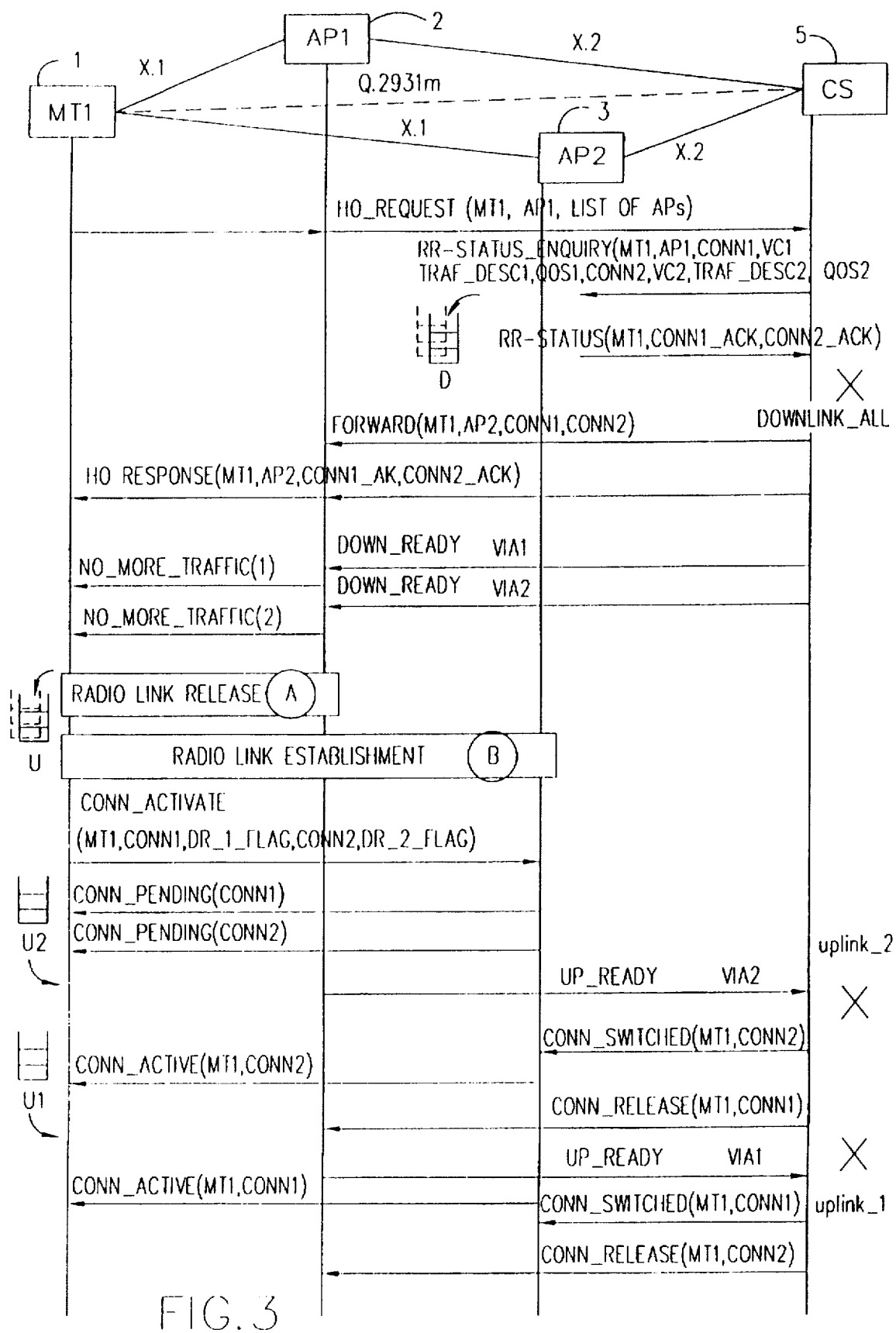
FIG. 3 illustrates a message sequence chart in the handover shown in FIGS. 2a–2f.

FIG. 3 illustrates a sequence chart of the messages that the mobile terminal 1, the old access point 2, the new access point 3 and the switch 5 exchange during a backward handover. In the chart of FIG. 3, the mobile terminal 1 has two separate ATM connections. The abbreviations and terms used in the drawing are as follows:

MT—Mobile Terminal
AP—Access Point
CS—Connection Switch
Conn—Connection
VC—Virtual Circuit
Traf_desc—Traffic descriptor
QoS—Quality of Service
ack—acknowledge
DR_flag
X—switching instant In addition to this, the drawing illustrates the buffer D of the downlink cells of the access point 3 and the buffer U of the uplink cells of the mobile terminal 1 at those points where the filling or emptying (marked with arrows) of a given buffer starts. The letter symbols of the buffers correspond to those in FIGS. 2a–2f.

Figure 4A:
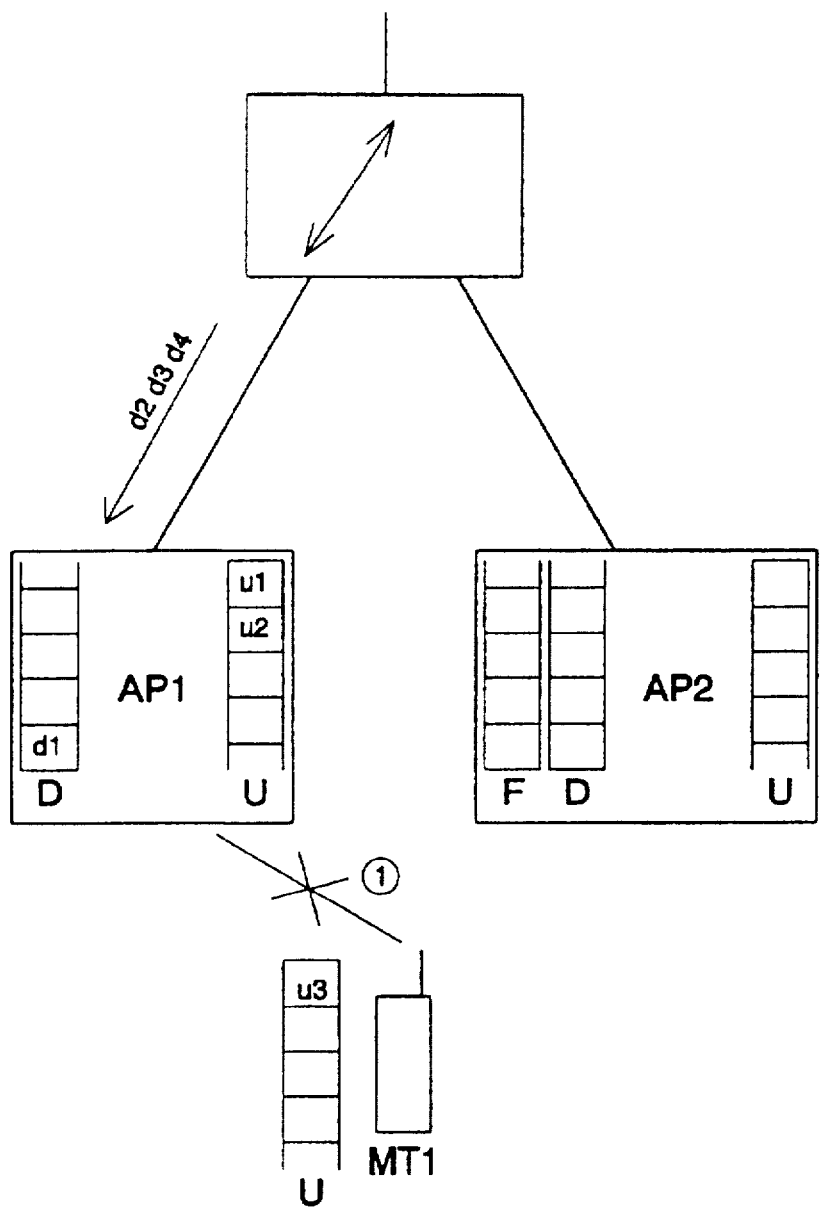
FIGS. 4a–4h illustrate the steps of application of a preferred embodiment of the invention in a forward handover.

Let us now discuss a forward handover caused by interference, where the mobile terminal disappears from the coverage area of the old access point so quickly that there is no time to officially terminate the connection. The specification refers to FIGS. 4a–4h, where similar symbols are used as in the FIGS. 2a–2f above. In the situation of FIG. 4a, the handover starts when the radio connection between the mobile terminal 1 and the old access point 2 terminates, in which case the old access point 2 stores the untransmitted downlink cells in the buffer D. The mobile terminal 1 respectively stores the untransmitted uplink cells in the buffer U.

Figure 4B:
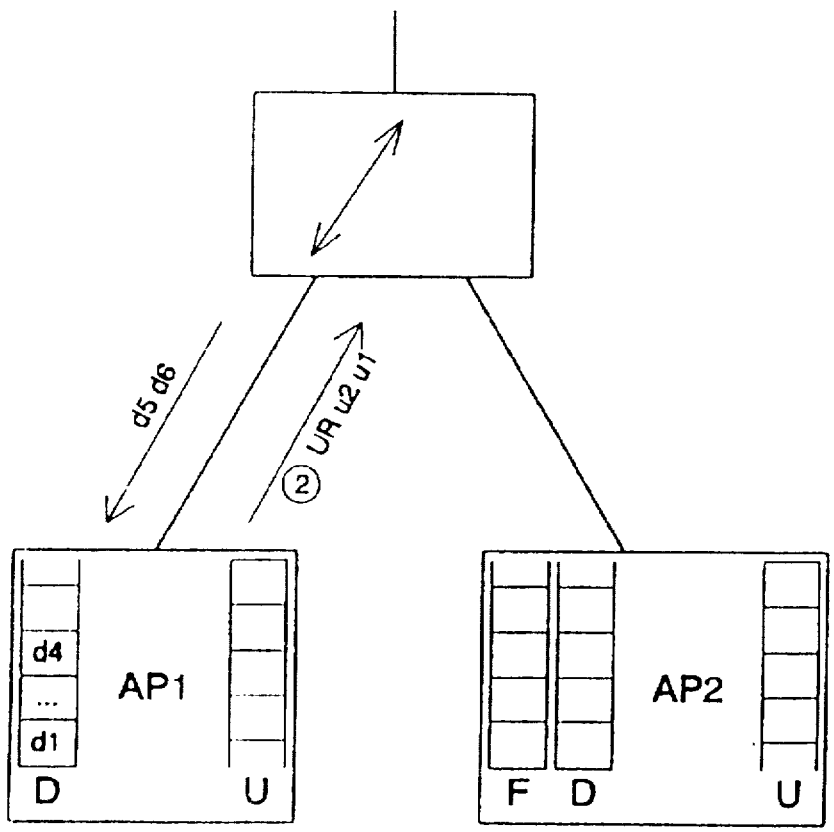
Figure 4B:
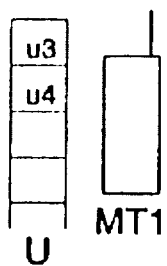

According to FIG. 4b, the old access point 2 forwards the rest of the received uplink cells to the access point and adds at the end of the cell stream a particular Up_ready signal UR. Here, like in the above situation, we assume that owing to a certain system of acknowledgement applied in the radio connection, the mobile terminal 1 and the old access point 2 have identical information as to which cells were successfully transmitted over the radio connection.

Figure 4C:
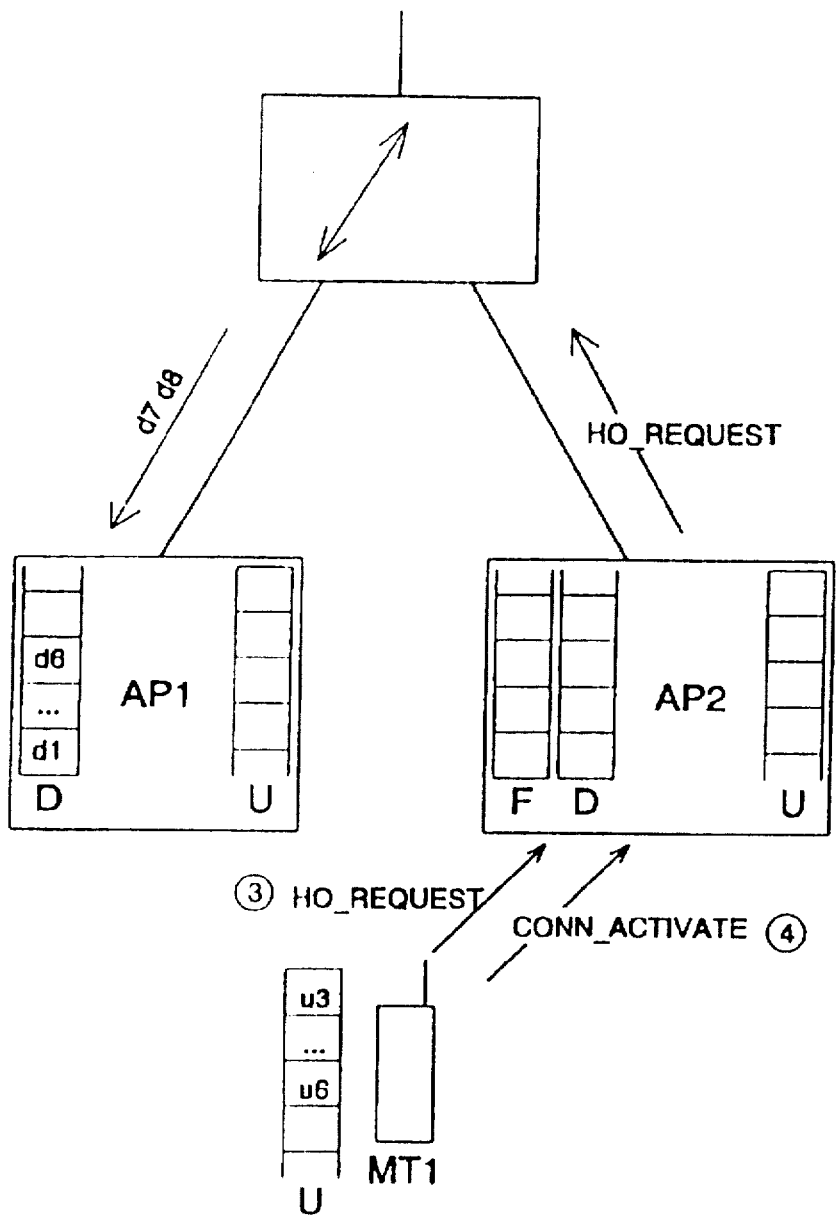
Figure 4D:
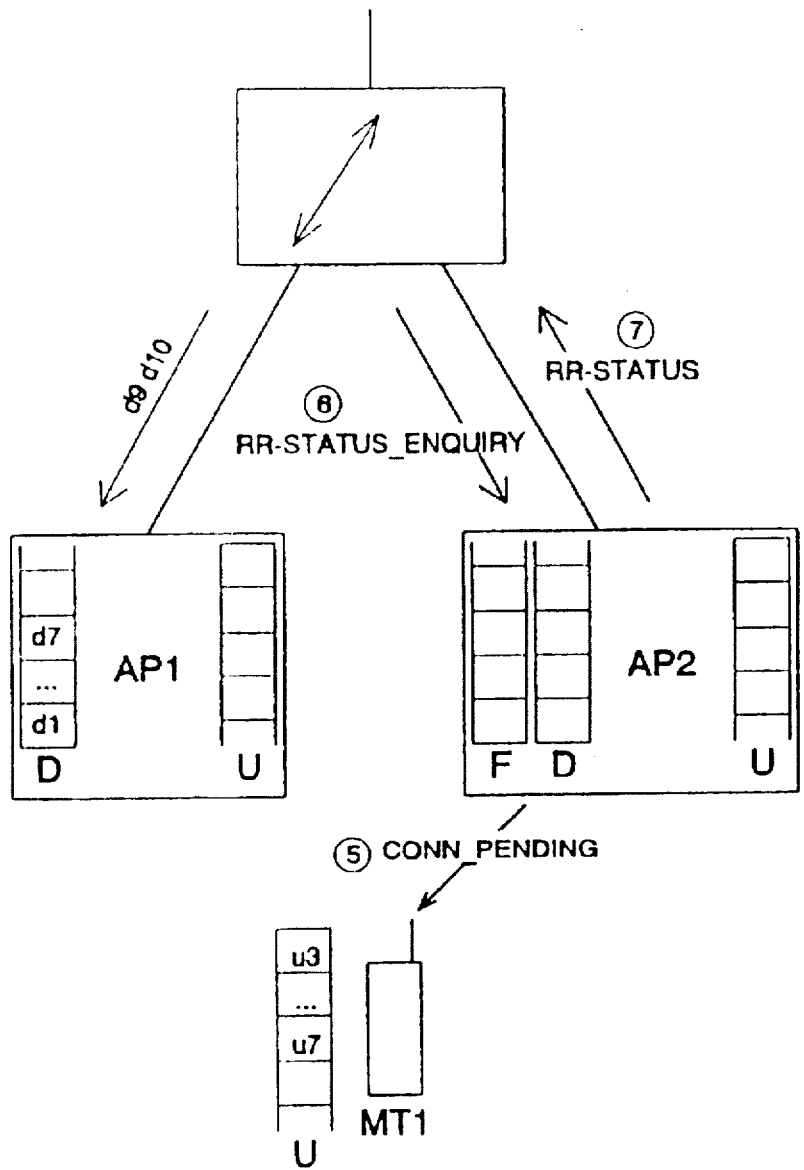

The mobile terminal 1 establishes a radio connection with the old access point 3 and transmits therethrough to the switch 5 a HO_REQUEST message expressing handover according to FIG. 4c. This message contains, among other things, a list in order of preference of those access points where the mobile terminal 1 can be handed over, i.e. the broadcast whereof it reads. The mobile terminal 1 also transfers to the new access point 3 a CONN_ACTIVATE message in order to activate the ATM connections to be transmitted. Because the uplink ATM connection cannot as yet be opened, the new access point 3 transfers to the mobile terminal 2 a given CONN_PENDING message according to FIG. 4d. As a response to the HO_REQUEST message, the switch 5 can send a status enquiry, i.e. a RR-STATUS_ENQUIRY message to all access points in the list or to part of them, in order to find out how the individual access points could take over the new connection. The responses of the access points to this message as well as the decision made on the basis thereof in the switch 5 are performed in the same fashion as above, in the case of the backward handover. Because the mobile terminal has established a connection through the access point 3 considering it as the preferred new access point, it is probable that the switch 5 decides to assign the connection to the access point 3. If the mobile terminal does not transmit a prioritised list of access points but only information of the old access point, the new access point can make direct contact with the old access point and require forwarding of the untransmitted downlink cells.

Figure 4E:
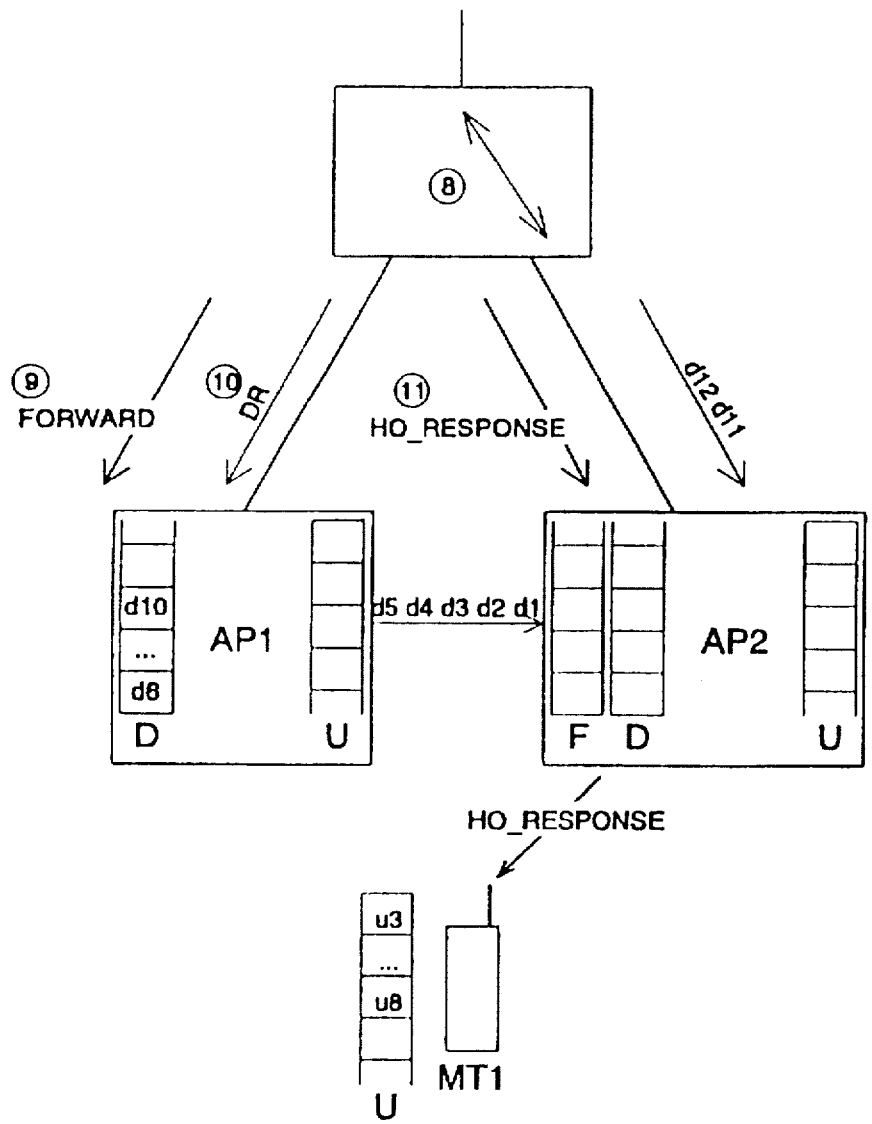
Figure 4F:
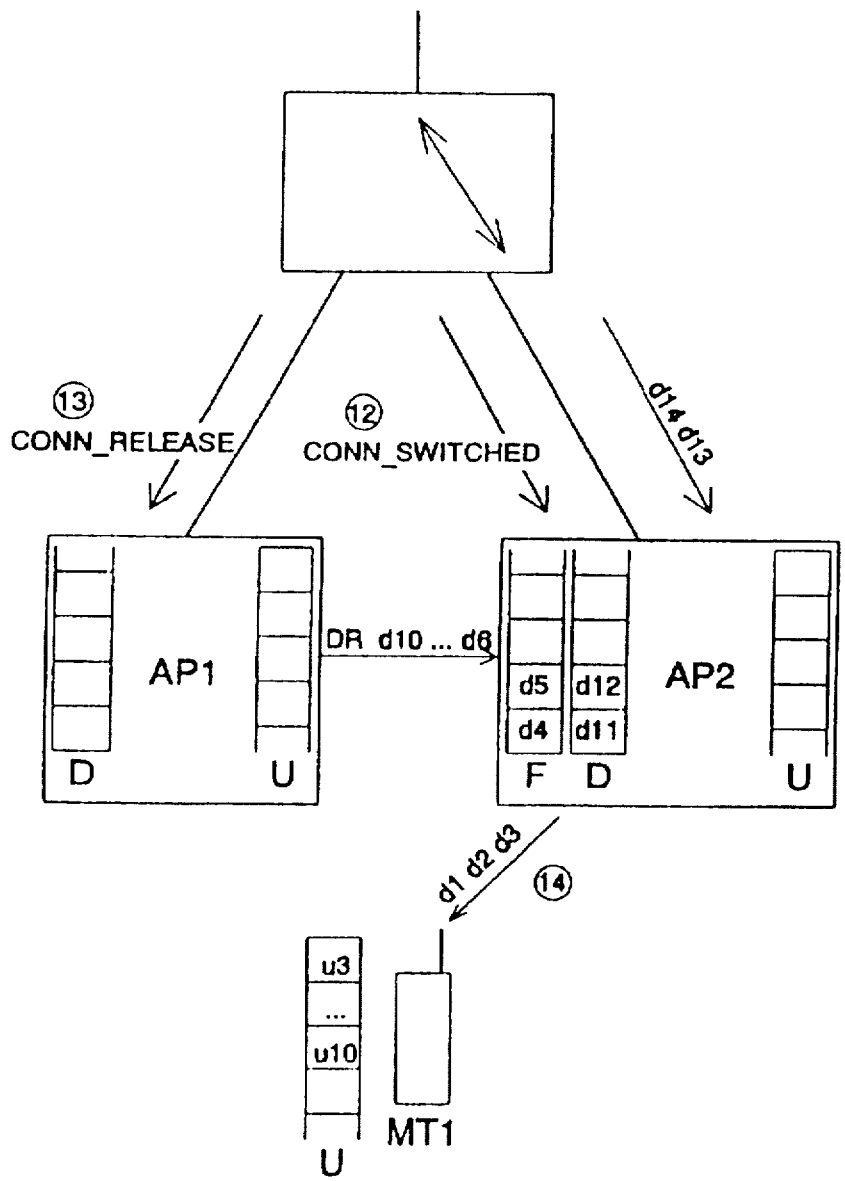
Figure 4G:
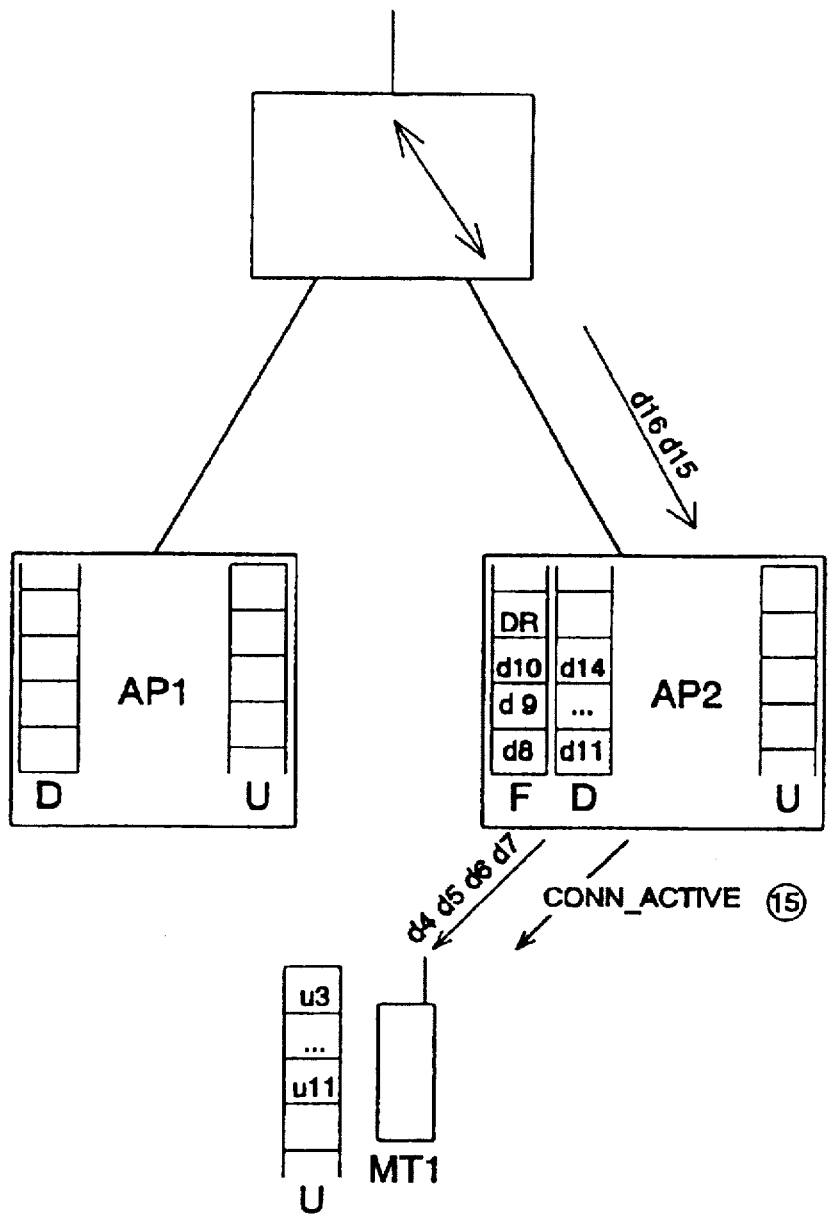

The switch hands the routing of both uplink and downlink cells simultaneously over to the new access point 3 according to FIG. 4e. At the same time it releases the resources possibly reserved in a preliminary reservation by other access points with a RR-DEALLOC message sent thereto and sends the old access point 2 a FORWARD message containing among others information of the new access point. Moreover, the switch 5 sends the old access point 2, after a routed cell, a Down_ready signal DR and transfers via the new access point 3 a handover response, i.e. a HO_RESPONSE message to the mobile terminal 1.

As a response to the FORWARD message, the old access point 2 sends all buffered downlink cells, including the last Down_ready signal, to the new access point 3. The new access point must include a particular forwarded cells register F, so that the cells forwarded from the old access point are not confused with the downlink cells coming directly from the switch 5. When the new access point 3 receives the Down_ready signal from the old access point 2, all cells have been forwarded. The new access point 3 can transmit the forwarded cells immediately to the mobile terminal 1, because the downlink ATM connection was earlier activated by the CONN_ACTIVATE message. According to FIG. 4f, the switch 5 sends the new access point a CONN_SWITCHED message and to the old access point a CONN_RELEASE message, which releases all resources reserved for terminated connections. When the new access point 3 has received the CONN_SWITCHED message, it sends, according to FIG. 4g, to the mobile terminal a CONN_ACTIVE message, in which case both uplink and downlink ATM connections are available via the new access point.

Figure 4H:
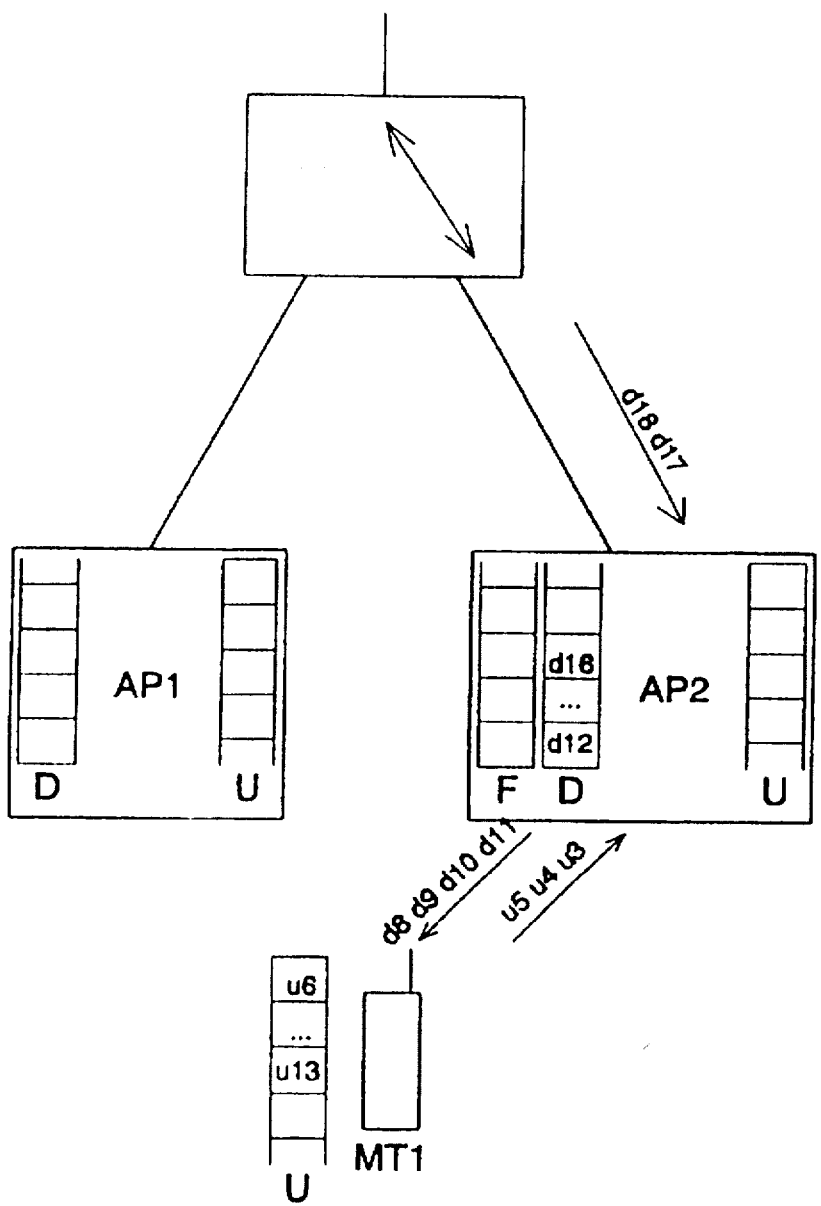
Figure 5:
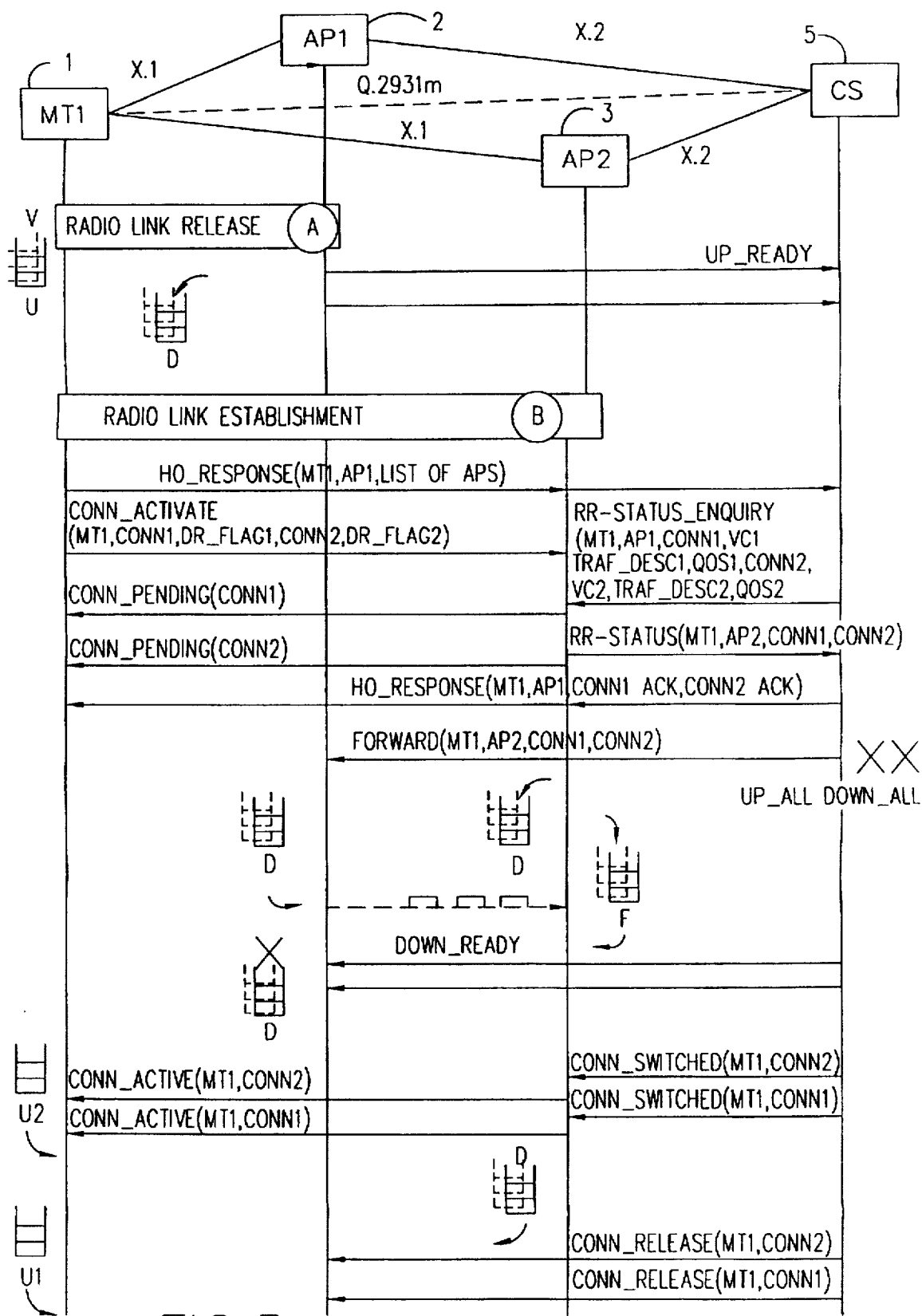
FIG. 5 illustrates a message sequence chart in the handover shown in FIGS. 4a–4h.

As was explained above, the new access point 3 transmits for the mobile terminal first the forwarded cells contained in the buffer F. When the new access point detects that only the Down_ready signal is left in the buffer, it may start transmitting those cells which were received directly from the switch 5 and stored temporarily in the buffer D, as is illustrated in FIG. 4h. FIG. 5 shows another timing chart which illustrates the relative timing of the messages in the above described process. Like symbols are used both in FIG. 5 and in FIG. 3.

It is apparent for anyone skilled in the art that the above described messages and their relative order are given by way of example only, and that they do not limit the invention in any way. Thus the preferred embodiments of the inventional idea presented in this patent application may in their practical realisations vary within the scope of the claims below. For instance, the CONN_PENDING message is not necessarily needed, because the activation of an uplink ATM connection is in any case declared separately by the CONN_ACTIVE message.

In a preferred application of the invention, the mobile terminal does not buffer uplink cells during a handover, but both the uplink and downlink buffering takes place in the access points. The above described HO_REQUEST message can in the new access point be interpreted as a resource reservation, in which case the mobile terminal can start the forwarding of uplink cells immediately, although the switch has not yet sent the CONN_SWITCHED message to the new access point.

In the above specification we have described how the invention is applied to a radio extension of an ATM system only, but the same inventional idea can also be applied to all such data transmission systems where the data transmission connection includes a certain quality of service which requires that resources are reserved in the access point.

What is claimed is:

1. A method for executing a handover in a data transmission system comprising a switch, a first access point, a second access point and a mobile terminal, and wherein data is transmitted in cells of a determined size, in which method, prior to the handover, cells are transferred from said switch to said first access point and therefrom by radio connection to said mobile terminal, and after the handover from said switch to said second access point and therefrom by radio connection to said mobile terminal, in which case said switch informs said first access point as to which is the last cell transmitted from the switch to the first access point, wherein said first access point checks whether all cells forwarded from the switch to the first access point prior to the handover were successfully transferred to said mobile terminal, whereafter as a response to the observation of the first access point that all cells forwarded from the switch to the first access point prior to the handover were successfully transmitted to said mobile terminal, said first access point acknowledges successful downlink transmission to said mobile terminal, which as a response to said acknowledgement further informs the second access point that the downlink transmission via the first access point has succeeded, and as a response to the observation of the first access point that not all cells forwarded from the switch to the first access point prior to the handover were successfully transmitted to said mobile terminal, said first access point directs those cells that were not successfully transmitted to said mobile terminal to be forwarded to the second access point.

2. A method according to claim 1, wherein said switch informs said first access point via a closing message as to which is the last cell transmitted from the switch to the first access point, and as a response to the observation of the first access point, that all cells forwarded from the switch to said access point prior to the handover were not successfully transferred to said mobile terminal, said first access point directs those cells that were not successfully transmitted to the mobile terminal, and said closing message to be forwarded to said second access point.

3. A method according to claim 2, wherein said second access point starts transmitting to the mobile terminal such downlink data which was forwarded directly from said switch to said second access point, but only after it has received said closing message from said first access point, in which case the second access point transmits also the cells forwarded from said first access point prior to transferring the cells forwarded directly from the switch, or it has received from said mobile terminal a message that the downlink transmission via the first access point has succeeded.

4. A method according to claim 1, further comprising, prior to the above mentioned steps, a step where said mobile terminal transmits over radio connection a request for handover, and that at least one of said first and second access points receives said request and transmits it to said switch.

5. A method according to claim 4, wherein as a response to said request, said switch makes a decision that said second access point is the new access point through which cells are transmitted to said mobile terminal after the handover.

6. A method according to claim 5 wherein, after making said decision, said switch sends said second access point information of the performed switching corresponding to the use of said new access point, and as a response to said switching information, said new access point notifies said mobile terminal of the opening of an uplink data transmission connection.

7. A method according to claim 5, wherein after making said decision, said switch informs said first access point that said second access point is the new access point.

8. A method according to claim 7, wherein after making said decision, said switch further sends said first access point a command to forward to the new access point those cells located in said first access point that could not be transmitted to said mobile terminal via said first access point.

* * * * *